United States Patent
Yonemoto et al.

(10) Patent No.: US 9,908,368 B2
(45) Date of Patent: Mar. 6, 2018

(54) RUBBER COMPOSITION AND TIRE USING SAME

(71) Applicants: BRIDGESTONE CORPORATION, Tokyo (JP); KAO CORPORATION, Tokyo (JP)

(72) Inventors: Makiko Yonemoto, Tokyo (JP); Tetsuo Takano, Wakayama (JP); Motoi Konishi, Wakayama (JP); Kojun Oshiro, Wakayama (JP)

(73) Assignees: BRIDGESTONE CORPORATION, Tokyo (JP); KAO CORPORATION, Tokyo (JP)

( * ) Notice: Subject to any disclaimer, the term of this patent is extended or adjusted under 35 U.S.C. 154(b) by 15 days.

(21) Appl. No.: 14/888,482

(22) PCT Filed: May 19, 2014

(86) PCT No.: PCT/JP2014/063162
§ 371 (c)(1),
(2) Date: Nov. 2, 2015

(87) PCT Pub. No.: WO2014/185545
PCT Pub. Date: Nov. 20, 2014

(65) Prior Publication Data
US 2016/0101650 A1   Apr. 14, 2016

(30) Foreign Application Priority Data

May 17, 2013 (JP) ................................ 2013-105594

(51) Int. Cl.
| | | |
|---|---|---|
| *C08K 5/10* | (2006.01) | |
| *C08K 5/17* | (2006.01) | |
| *B60C 1/00* | (2006.01) | |
| *C08K 5/103* | (2006.01) | |
| *C08K 3/34* | (2006.01) | |
| *C08K 3/04* | (2006.01) | |
| *C08K 3/22* | (2006.01) | |

(52) U.S. Cl.
CPC .............. *B60C 1/0008* (2013.01); *C08K 3/04* (2013.01); *C08K 3/22* (2013.01); *C08K 3/34* (2013.01); *C08K 3/346* (2013.01); *C08K 5/10* (2013.01); *C08K 5/103* (2013.01); *C08K 5/17* (2013.01); *C08K 2003/2296* (2013.01)

(58) Field of Classification Search
CPC . C08K 3/34; C08K 3/346; C08K 5/10; C08K 5/103
See application file for complete search history.

(56) References Cited

U.S. PATENT DOCUMENTS

| 4,500,666 A | 2/1985 | Wada |
| 5,714,533 A | 2/1998 | Hatakeyama et al. |
| 5,717,022 A | 2/1998 | Beckmann et al. |
| 2010/0240817 A1 | 9/2010 | Joshi et al. |

FOREIGN PATENT DOCUMENTS

| EP | 2 112 003 A1 | 10/2009 |
| JP | 53-8643 A | 1/1978 |
| JP | 57-100150 A | 6/1982 |
| JP | 58-198550 A | 11/1983 |
| JP | 60013839 A * | 1/1985 |
| JP | 63-39935 A | 2/1988 |
| JP | 5-17641 A | 1/1993 |
| JP | 9-118786 A | 5/1997 |
| JP | 11-140234 A | 5/1999 |
| JP | 11323070 A * | 11/1999 |
| JP | 2006-225481 A | 8/2006 |
| JP | 4053988 B2 | 2/2008 |
| JP | 2012-520928 A | 9/2012 |
| WO | 95/31888 A2 | 11/1995 |
| WO | 03/067558 A1 | 8/2003 |
| WO | 2012105697 A1 | 8/2012 |

OTHER PUBLICATIONS

Machine translation of JP 60013839 A, 1985.*
Machine translation of JP 11323070 A, 1999.*
International Preliminary Report on Patentability dated Nov. 26, 2015 from the International Bureau in counterpart International Application No. PCT/JP2014/063162.
Communication dated Nov. 9, 2016, from the European Patent Office in counterpart European application No. 14797435.6.
International Search Report of PCT/JP2014/063162 dated Aug. 26, 2014.

* cited by examiner

*Primary Examiner* — Wenwen Cai
(74) *Attorney, Agent, or Firm* — Sughrue Mion, PLLC (57) ABSTRACT

Provided is a rubber composition containing a high stratified or tabular clay mineral content, wherein the dispersion of the stratified or tabular clay minerals is improved, thus reducing air permeability and improving flex resistance. Also provided is a tire using the rubber composition. An example of the rubber composition is a rubber composition containing a rubber component (A), a stratified or tabular clay mineral (B), and a glycerin fatty acid ester composition (C).

12 Claims, 1 Drawing Sheet

RUBBER COMPOSITION AND TIRE USING SAME

CROSS REFERENCE TO RELATED APPLICATIONS

This is a National Stage of International Application No. PCT/JP2014/063162 filed May 19, 2014, claiming priority based on Japanese Patent Application No. 2013-105594 filed May 17, 2013, the contents of all of which are incorporated herein by reference in their entirety.

TECHNICAL FIELD

The present invention relates to a rubber composition and a tire produced by using the same, more specifically to a rubber composition suited to an inner liner of a tire in which a stratified or tabular clay mineral is enhanced in a dispersibility in a rubber composition to improve a low air permeability and a bending resistance, and a tire prepared by using the above rubber composition.

BACKGROUND ART

A lot of technologies in which an inner liner having a low air permeability to reduce a thickness of a gauge thereof for the purpose of reducing a fuel consumption and decreasing a weight of a tire have so far been proposed.

Capable of being provided is, for example, a rubber composition for an inner liner having a low air permeability by blending a rubber composition for an inner liner with a polyamide base resin or a low air-holding thermoplastic resin. However, the problems that the bending resistance and the low temperature fatigue resistance are limited and that the versatility is poor have been involved in the above method.

On the other hand, known as filling materials of a rubber composition for an inner liner are:
1) a rubber composition for an inner liner prepared by blending 100 parts by weight of a rubber component with 10 to 50 parts by weight of tabular mica having an aspect ratio of 50 to 100 (refer to, for example, patent document 1), and
2) a rubber composition for an inner liner containing 100 parts by weight of a rubber component containing 20 to 50 parts by weight of diene base rubber and 50 to 80 parts by weight of halogenated butyl rubber, and 30 to 50 parts by weight of clay having an aspect ratio of 30 or more as a white filler (refer to, for example, patent document 2). However, there have been involved therein the problems that when the filler is increased in an amount, it is not uniformly dispersed by kneading rubber and that inferior dispersion thereof is liable to bring about a reduction in the bending resistance.

On the other hand, there have so far been known as a technology for improving a processability and the like in white filler-blended rubber compositions prepared by using glycerin fatty acid esters and the like, for example: 3) a rubber composition improved in an electrostatic property which is prepared by blending 100 parts by weight of a rubber containing 90 parts by weight or more of a diene base rubber with 30 to 120 parts by weight of a filler containing 40% by weight or more of a white filler and 0.2 to 8 parts by weight of a nonionic surfactant (refer to, for example, patent document 3), and
4) a rubber composition for a tire tread containing at least one polymer selected from the group of diene rubbers, and 5 to 100 parts by weight of fine powder non-precipitated silicic acid, 0 to 80 parts by weight of carbon black, and 0.5 to 20 parts by weight of at least one non-aromatic viscosity-reducing substance each based on 100 parts by weight of a rubber contained in the rubber composition, wherein the non-aromatic viscosity-reducing substance described above is at least one substance selected from the group consisting of glycerin monostearate, sorbitan monostearate, sorbitan monooleate, and trimethylolpropane(2-ethyl-2-hydroxymethyl-1,3-propanediol) (refer to, for example, patent document 4).

In the patent document 3 out of the patent documents 3 and 4, an effect of preventing electrification different from the present invention which can be brought about in blending glycerin fatty acid monoester and silica is described in one of the examples, but an effect of enhancing a dispersibility of a stratified or tabular clay mineral to improve a low air permeability and a bending resistance of the tire is neither described nor suggested therein.

Also, an effect of reducing a viscosity in blending silica by blending glycerin fatty acid monoester is described in the patent document 4 described above, but an effect of enhancing a dispersibility of a stratified or tabular clay mineral to improve a low air permeability and a bending resistance of the tire is neither described nor suggested therein.

PRIOR ART DOCUMENTS

Patent Documents

Patent document 1: JP-A H11-140234 (claims, examples and the like)
Patent document 2: JP-A H5-17641 (claims, examples and the like)
Patent document 3: International Publication WO95/31888 (claims, examples and the like)
Patent document 4: JP-A H9-118786 (claims, examples and the like)

DISCLOSURE OF THE INVENTION

The present invention intends to solve the problems on the conventional technologies described above and the like, and an object thereof is to provide a rubber composition in which the dispersibility of a stratified or tabular clay mineral in a rubber composition is enhanced to improve a low air permeability and a bending resistance, a tire prepared by using the above rubber composition, a production process for a rubber composition, use of a rubber composition for an inner liner of a tire, and a viscosity reduction method for an unvulcanized rubber.

In light of the problems on the conventional technologies described above and the like, intense investigations repeated by the present inventors have resulted in finding that a rubber composition which meets the object described above, a tire prepared by using the above rubber composition, a method for producing a rubber composition, use of a rubber composition for an inner liner of a tire, and a viscosity reduction method for an unvulcanized rubber are achieved by blending a rubber component with a stratified or tabular clay mineral and a specific compound, and thus, the present inventors have come to complete the present invention.

That is, the present invention resides in the following items (1) to (18).
(1) A rubber composition characterized by being prepared by blending a rubber component (A), a stratified or tabular clay mineral (B) and a glycerin fatty acid ester composition (C).

(2) The rubber composition as described in the above item (1), characterized in that the fatty acid of the glycerin fatty acid ester composition (C) has preferably 8 to 28 carbon atoms, further preferably 8 to 22 carbon atoms, further more preferably 10 to 18 carbon atoms, further more preferably 12 to 18 carbon atoms and further more preferably 16 to 18 carbon atoms.

(3) The rubber composition as described in the above item (1) or (2), characterized in that the glycerin fatty acid ester composition (C) contains glycerin fatty acid monoester and glycerin fatty acid diester, and a content of the glycerin fatty acid monoester in the glycerin fatty acid ester composition is preferably 35% by mass or more, more preferably 35 to 98% by mass, further preferably 45 to 90% by mass and further preferably 50 to 80% by mass.

(4) The rubber composition as described in any one of the above items (1) to (3), characterized in that the glycerin fatty acid ester composition (C) contains glycerin fatty acid monoester and glycerin fatty acid diester, and a content of the glycerin fatty acid diester in the glycerin fatty acid ester composition is preferably 65% by mass or less, more preferably 5 to 65% by mass, further preferably 15 to 65% by mass, further more preferably 15 to 50% by mass, further preferably 25 to 50% by mass and further more preferably 20 to 50% by mass.

(5) The rubber composition as described in any one of the above items (1) to (4), characterized in that a blend amount of the glycerin fatty acid ester composition (C) is preferably 0.1 to 20 parts by mass, more preferably 0.25 to 15 parts by mass based on 100 parts by mass of the stratified or tabular clay mineral (B).

(6) The rubber composition as described in any one of the above items (1) to (4), characterized in that a blend amount of the glycerin fatty acid ester composition (C) is preferably 0.25 to 10 parts by mass, further preferably 0.5 to 8 parts by mass and further more preferably 1 to 7 parts by mass based on 100 parts by mass of the stratified or tabular clay mineral (B).

(7) The rubber composition as described in any one of the above items (1) to (6), characterized in that a blend amount of the glycerin fatty acid ester composition (C) is preferably 0.5 to 20 parts by mass, more preferably 1 to 15 parts by mass, further preferably 2 to 12 parts by mass, further more preferably 3 to 11 parts by mass and further more preferably 3 to 10 parts by mass based on 100 parts by mass of the rubber component (A).

(8) The rubber composition as described in any one of the above items (1) to (7), characterized in that a blend amount of the stratified or tabular clay mineral (B) is preferably 20 to 200 parts by mass, more preferably 30 to 150 parts by mass, further preferably 50 to 120 parts by mass and more preferably 70 to 120 parts by mass based on 100 parts by mass of the rubber component (A).

(9) The rubber composition as described in any one of the above items (1) to (9), characterized in that the stratified or tabular clay mineral (B) is clay, mica, talc or feldspar.

(10) The rubber composition as described in any one of the above items (1) to (8), characterized in that the stratified or tabular clay mineral (B) is clay.

(11) The rubber composition as described in any one of the above items (1) to (10), characterized in that the rubber component (A) is a diene base rubber or a butyl base rubber, or a mixture of a diene base rubber and a butyl base rubber.

(12) The rubber composition as described in the above item (11), characterized in that the diene base rubber is at least one selected from a natural rubber, an isoprene rubber, a styrene butadiene rubber and a butadiene rubber.

(13) The rubber composition as described in any one of the above items (1) to (12), wherein the rubber composition is a rubber composition for an inner liner of a tire.

(14) The rubber composition as described in any one of the above items (1) to (13), wherein the rubber composition is obtained by blending preferably 20 parts by mass or more of the stratified or tabular clay mineral (B) based on 100 parts by mass of the rubber component (A) and the glycerin fatty acid ester composition (C), kneading and vulcanizing the resulting blended matter.

(15) A production process for the rubber composition as described in any one of the above items (1) to (13), wherein 100 parts by mass of a rubber component (A) is blended with preferably 20 parts by mass or more of a stratified or tabular clay mineral (B) and a glycerin fatty acid ester composition (C), and then the resulting blended matter is kneaded and vulcanized.

(16) A tire characterized by being produced by using the rubber composition as described in any one of the above items (1) to (14) for an inner liner.

(17) Use of the rubber composition as described in any one of the above items (1) to (14) for an inner liner of a tire.

(18) A viscosity reduction method for an unvulcanized rubber characterized by being prepared by blending a rubber component (A), a stratified or tabular clay mineral (B) and a glycerin fatty acid ester composition (C).

According to the present invention, provided are a rubber composition in which a dispersibility of a stratified or tabular clay mineral is improved in a rubber composition and in which a processability is enhanced by reducing a viscosity of an unvulcanized rubber to improve a low air permeability and a bending resistance, a tire prepared by using the above rubber composition, a production process for a rubber composition, use of a rubber composition for an inner liner of a tire, and a viscosity reduction method for an unvulcanized rubber.

MODE FOR CARRYING OUT THE INVENTION

The rubber composition of the present invention is characterized by being prepared by blending a rubber component (A), a stratified or tabular clay mineral (B) and a glycerin fatty acid ester composition (C).

Rubber Component (A):

The rubber component (A) used for the rubber composition of the present invention is composed of a diene base rubber or a butyl base rubber, or a mixture of a diene base rubber and a butyl base rubber. In this regard, the diene base rubber includes a natural rubber (NR), a polyisoprene rubber (IR), a styrene-butadiene copolymer rubber (SBR), a polybutadiene rubber (BR), an ethylene-propylene copolymer, and the like. The above diene base components may be used alone or in a blend of two or more kinds thereof.

In the rubber composition of the present invention, the rubber component (A) is preferably the butyl base rubber. When the rubber component (A) is the butyl base rubber, an air permeability of the rubber composition can be reduced to a large extent, and the rubber composition suited to an inner liner of a tire is obtained. A content of the butyl base rubber in the rubber component (A) is preferably 80 to 100% by mass. In the above case, the rubber component (A) is composed of more preferably 80 to 100% by mass of the butyl base rubber and 20 to 0% by mass of the other diene base rubbers, particularly preferably 95 to 100% by mass of the butyl base rubber and 5 to 0% by mass of the other diene base rubbers. In this connection, the other diene base rubbers show diene base rubber other than the butyl base rubber. Halogenated butyl rubbers in addition to the butyl rubber (IIR) are included as well in the butyl base rubber, and the halogenated butyl rubber includes chlorinated butyl rubbers, brominated butyl rubbers, halogenated copolymers of isobutylene and p-methylstyrene (particularly brominated copolymers of isobutylene and p-methylstyrene), and the like. The halogenated copolymer of isobutylene and p-methylstyrene contains usually 0.5 to 20 mole % of p-methylstyrene. The brominated copolymers of isobutylene and p-methylstyrene are commercially available from Exxon Mobil Chemical Company at a trade name "EXXPRO 89-4" (registered trademark) (about 5% by mass of p-methylstyrene and about 0.75 mole % of bromine).

Stratified or Tabular Clay Mineral (B):

Either of natural products and synthetic products can be used for the stratified or tabular clay mineral (B) used for the rubber composition of the present invention. The stratified or tabular clay mineral (B) includes, for example, clays such as kaolin base clay, sericite base clay, burned clay and the like; smectite base clay minerals such as montmorillonite, saponite, hectorite, beidellite, stevensite, nontronite and the like; mica, feldspar, vermiculite, halloysite, talc, swelling mica, and the like. Among them, clay, mica, talc or feldspar is preferred; clay, mica or talc is further preferred; and clay or talc is further more preferred. The above stratified or tabular clay minerals (B) may be either natural products or synthesized products. They may be used alone or in combination of two or more kinds thereof.

The clay mineral used for the rubber composition of the present invention is more preferably clay, further preferably tabular clays such as kaolin base clay, sericite base clay, burned clay, silane-modified clays subjected to surface treatment, and the like, and particularly preferably kaolin base clay.

A too large average particle diameter (average stoke-corresponding diameter) of the above stratified or tabular clay minerals of the component (B) brings about a reduction in the bending resistance, and therefore it should be in a range of preferably 50 μm or less, more preferably 0.2 to 30 μm, particularly preferably 0.2 to 5 μm and most preferably 0.2 to 2 μm.

If an average aspect ratio of the stratified or tabular clay mineral (B) is preferably 2 to 200, the surfaces of the stratified or tabular clay mineral particles are aligned to block off a permeation route of air, and as a result thereof, the good air permeation resistance (low air permeability) is obtained. The average aspect ratio is controlled to preferably 3 to 150, more preferably 5 to 100, further preferably 5 to 50 and particularly preferably 5 to 25, whereby the more excellent air permeability can be obtained.

If an average aspect ratio of the component (B) is 200 or less, the component (B) is more uniformly dispersed in kneading the rubber, and the bending resistance and the air permeation resistance can suitably be prevented from being reduced due to poor dispersion. Also, if the average aspect ratio is 3 or more, the air permeation resistance is more enhanced.

Figure 1:
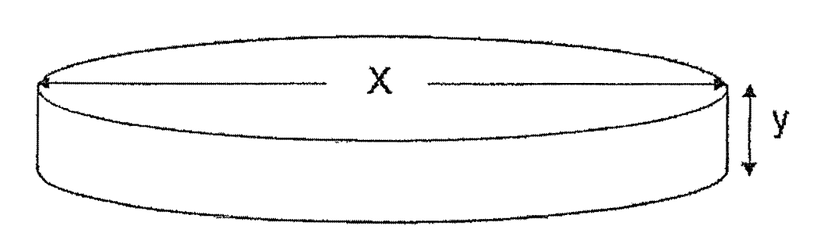
FIG. 1 is an explanatory drawing for determining an average aspect ratio of the stratified or tabular clay mineral (B) used in the present invention.

The average aspect ratio in the present invention (including examples described later) is determined, as shown in FIG. 1, in terms of x/y, wherein x is an average major diameter, and y is an average thickness.

A blend amount of the stratified or tabular clay mineral (B) based on 100 parts by mass of the rubber component described above is preferably 20 parts by mass or more, more preferably 30 parts by mass or more, further preferably 50 parts by mass or more and further more preferably 70 parts by mass or more from the viewpoint of the air permeability, and from the viewpoint of enhancing the workability, it is preferably 200 parts by mass or less, more preferably 150 parts by mass or less and further preferably 120 parts by mass or less and falls in a range of preferably 5 to 200 parts by mass, more preferably 20 to 200 parts by mass, more preferably 30 to 150 parts by mass, further preferably 50 to 120 parts by mass, further more preferably 60 to 120 parts by mass and further more preferably 70 to 120 parts by mass. In the case of the present invention, even if the stratified or tabular clay mineral (B) is blended in a high amount of 120 parts by mass or more based on 100 parts by mass of the rubber component described above, the effects of the present invention can be exerted.

In the present invention, carbon black and the like in addition to the stratified or tabular clay mineral (B) described above can be used in combination as a reinforcing filler.

The usable carbon black shall not specifically be restricted, and grades such as, for example, FEF, SRF, HAF, ISAF, SAF and the like can be used.

A blend amount of the above carbon blacks shall not specifically be restricted as well, and it is 0 to 60 parts by mass, further preferably 10 to 50 parts by mass based on 100 parts by mass of the rubber component described above. The blend amount is preferably 60 parts by mass or less from the viewpoint of maintaining the heat buildup.

Glycerin Fatty Acid Ester Composition (C):

Glycerin fatty acid ester contained in the glycerin fatty acid ester composition (C) is obtained by subjecting fatty acid (having preferably 8 to 28 carbon atoms) to ester bonding with at least one of three OH groups present in glycerin, and it is classified into glycerin fatty acid monoester, glycerin fatty acid diester and glycerin fatty acid triester according to the number of fatty acids connected to the glycerin.

The glycerin fatty acid ester composition used in the present invention may contain 1) glycerin fatty acid monoester alone, 2) a mixture of glycerin fatty acid monoester and glycerin fatty acid diester, and 3) a mixture of 1) or 2) with glycerin fatty acid triester or glycerin.

In the present invention, the fatty acid constituting the glycerin fatty acid ester has preferably 8 to 28 carbon atoms, further preferably 8 to 22 carbon atoms, further more preferably 10 to 18 carbon atoms, further more preferably 12 to 18 carbon atoms and further more preferably 16 to 18 carbon atoms from the viewpoint of enhancing the processability by a reduction in a viscosity of the unvulcanized rubber, the low air permeability, the bending resistance, the heat resistance and the like. Also, the fatty acid may be any of saturated, unsaturated, linear and branched fatty acids, and linear saturated fatty acids are particularly preferred. The specific examples of the fatty acid include capric acid, lauric acid, myristic acid, palmitic acid, stearic acid, isostearic acid, oleic acid, linoleic acid, and the like. The fatty acid is preferably lauric acid, palmitic acid and stearic acid, particularly preferably palmitic acid and stearic acid.

Fatty acids having less than 8 carbon atoms has a low affinity with the polymer and are liable to cause blooming. On the other hand, fatty acids having more than 28 carbon atoms are not different from fatty acids having 28 or less carbon atoms in terms of raising a processability-improving effect and raise the cost, and therefore they are not preferred.

In the glycerin fatty acid ester composition used in the present invention, the fatty acid has preferably 8 to 28 carbon atoms; (a) the glycerin fatty acid ester composition contains glycerin fatty acid monoester and glycerin fatty acid diester, and a content of the glycerin fatty acid monoester in the composition described above is preferably 35% by mass or more; and (b) the glycerin fatty acid ester composition described above contains glycerin fatty acid monoester and glycerin fatty acid diester, and a content of the glycerin fatty acid diester in the composition is preferably 65% by mass or less.

Blending of the glycerin fatty acid ester composition of (a) and/or (b) described above makes it possible to enhance the processability by reducing a viscosity of the unvulcanized rubber blended with the stratified or tabular clay mineral (B) and to highly achieve various performances such as the low air permeability, and further, the bending resistance and the heat resistance which are antinomic performances.

In the present invention, the rubber composition in which a content of the glycerin fatty acid monoester in the glycerin fatty acid ester composition (C) is less than 35% by mass or the rubber composition in which a content of the glycerin fatty acid diester exceeds 65% by mass has a small effect of improving the low air permeability and the bending resistance.

Accordingly, from the viewpoints of reducing a viscosity of the unvulcanized rubber and improving the low air permeability and the bending resistance, a content of the glycerin fatty acid monoester in the glycerin fatty acid ester composition is preferably 35% by mass or more, more preferably 45% by mass or more, further preferably 50% by mass or more, further more preferably 55% by mass or more, further more preferably 70% by mass or more and further more preferably 80% by mass or more. Also, from the viewpoints of improving the heat resistance, a content of the glycerin fatty acid monoester is preferably 98% by mass or less, more preferably 90% by mass or less, further preferably 80% by mass or less and further more preferably 70% by mass or less. To summarize the viewpoints described above, a content of the glycerin fatty acid monoester is preferably 35 to 98% by mass, more preferably 45 to 90% by mass, and from the viewpoint of a productivity of the glycerin fatty acid ester composition, a content of the glycerin fatty acid monoester is further more preferably 50 to 80% by mass.

Also, from the viewpoint of improving the heat resistance and enhancing a productivity of the glycerin fatty acid ester composition, a content of the glycerin fatty acid diester in the glycerin fatty acid ester composition (C) is preferably 5% by mass or more, more preferably 15% by mass or more and further preferably 25% by mass or more, and from the viewpoints of reducing a viscosity of the unvulcanized rubber and improving the low air permeability and the bending resistance, a content of the glycerin fatty acid diester is preferably 65% by mass or less, more preferably 55% by mass or less and further preferably 50% by mass or less. To summarize the viewpoints described above, a content of the glycerin fatty acid diester is preferably 5 to 65% by mass, more preferably 15 to 65% by mass, further preferably 15 to 50% by mass and further more preferably 25 to 50% by mass. Further, from the viewpoint of a productivity of the glycerin fatty acid ester composition, a content of the glycerin fatty acid diester is further more preferably 20 to 50% by mass.

Further, from the viewpoint of preventing the physical properties of the rubber from being excessively reduced (reduction in the storage elastic modulus, and the like) after vulcanization, a content of the glycerin fatty acid triester in the glycerin fatty acid ester composition (C) is preferably 10% by mass or less, more preferably 5% by mass or less and further preferably 3% by mass or less, and from the viewpoint of the productivity, a content of the glycerin fatty acid triester may be 0.3% by mass or more.

From the viewpoints of reducing a viscosity of the unvulcanized rubber and improving the heat resistance, the low air permeability and the bending resistance, a total content of the glycerin fatty acid diester and the glycerin fatty acid triester in the glycerin fatty acid ester composition is preferably 15 to 50% by mass, more preferably 17 to 50% by mass.

In particular, from the viewpoints of reducing a viscosity of the unvulcanized rubber and improving the low air permeability, the bending resistance and the heat resistance, a content of the glycerin fatty acid monoester in the glycerin fatty acid ester composition is preferably 50 to 85% by mass, and a total content of the glycerin fatty acid diester and the glycerin fatty acid triester is preferably 15 to 50% by mass; a content of the glycerin fatty acid monoester in the glycerin fatty acid ester composition is further preferably 50 to 80% by mass, and a total content of the glycerin fatty acid diester and the glycerin fatty acid triester is preferably 20 to 50% by mass; a content of the glycerin fatty acid monoester is preferably 50 to 85% by mass, and a content of the glycerin fatty acid diester is preferably 15 to 50% by mass; and a content of the glycerin fatty acid monoester is further preferably 50 to 80% by mass, and a content of the glycerin fatty acid diester is further preferably 20 to 50% by mass.

Also, in producing the glycerin fatty acid ester composition used in the present invention, glycerin remains as an unreacted raw material in a certain case. From the viewpoint of preventing the heat resistance from being reduced, a content of the glycerin in the glycerin fatty acid ester composition is preferably 10% by mass or less, more preferably 5% by mass or less and further preferably 3% by mass or less, and it may be 0.3% by mass or more from the viewpoint of the productivity.

In the glycerin fatty acid ester composition, two or more kinds of the glycerin fatty acid monoester and the glycerin fatty acid diester each having a different content may be used.

In the present invention, the glycerin fatty acid ester composition used can be produced by an esterification method in which the composition is produced from glycerin and fatty acid and a transesterification method in which oil & fat and the like and glycerin are used as raw materials, and a method for producing the composition in which an amount of the monoester in the glycerin fatty acid ester composition is controlled includes the following respective methods of 1) to 3):

1) a method in which a charge ratio of a fatty acid component and a glycerin component is changed in the esterification method and the transesterification method each described above to thereby control an equilibrium composition in esterification. Glycerin can be removed by further distillation. However, an upper limit of an amount of glycerin fatty acid monoester is considered to be about 65% by mass in terms of a reaction characteristic;

2) a method in which a reaction product obtained in the esterification method and the transesterification method is further subjected to fractional distillation such as molecular distillation to obtain a glycerin fatty acid ester composition having a high purity of monoester (usually 95% by mass or more); and 3) a method in which the glycerin fatty acid ester composition obtained by the method of 1) is mixed with the glycerin fatty acid ester composition obtained by the method of 2) at an optional ratio to thereby obtain a glycerin fatty acid ester composition containing about 65 to 95% by mass of monoester.

Use of fat and oil and fatty acid as the raw materials which originate in natural products makes it possible to use a glycerin fatty acid ester composition which is reduced in an environmental load and the like.

Further, in the glycerin fatty acid ester composition used in the present invention, a commercial product in which an amount of monoester is controlled can be used, and the examples of the commercial product include, for example, stearic monoglyceride (Rheodol MS-60 and Excel S-95, manufactured by Kao Corporation), and the like.

In the present invention, a content of the monoglyceride (content of the glycerin fatty acid monoester) in the glycerin fatty acid ester composition shows a content determined according to the following equation (I) by GPC (gel permeation chromatography) analysis, and it means an area ratio of monoglyceride to a sum of glycerin, monoglyceride, diglyceride (glycerin fatty acid diester) and triglyceride (glycerin fatty acid triester) in GPC analysis:

$$\text{monoglyceride concent(area \%)} = \frac{MG}{[G + MG + DG + TG]} \times 100 \quad (I)$$

(in the equation (I) described above, G is an area of glycerin in GPC analysis; MG is an area of monoglyceride in GPC analysis; DG is an area of diglyceride in GPC analysis; and TG is an area of triglyceride in GPC analysis).

The measuring conditions of GPC are shown below.
Measuring Conditions of GPC:

GPC was measured by using the following measuring equipment, wherein THF (tetrahydrofuran) as an eluent was allowed to flow at a rate of 0.6 mL/minute to stabilize a column in a thermostatic bath of 40° C. A sample solution 10 g L of 1% by weight prepared by dissolving the sample in THF was injected thereinto to carry out measurement:

Standard substance: monodispersed polystyrene
Detector: RI-8022 (manufactured by Tosoh Corporation)
Measuring equipment: HPLC-8220 GPC (manufactured by Tosoh Corporation)
Analytical column: connecting two columns of TSK-GEL SUPER H1000 and two columns of TSK-GEL SUPER H2000 in series (manufactured by Tosoh Corporation)

Similarly, a content of the diglyceride in the glycerin fatty acid ester composition means an area ratio of diglyceride to a sum of glycerin, monoglyceride, diglyceride and triglyceride in GPC analysis.

The examples of the glycerin fatty acid ester composition in which an amount of usable monoester is controlled include, for example, glyceryl caprylate-containing compositions in which fatty acid has 8 carbon atoms, glyceryl decanoate-containing compositions in which fatty acid has 10 carbon atoms, glyceryl laurate-containing compositions in which fatty acid has 12 carbon atoms, glyceryl myristate-containing compositions in which fatty acid has 14 carbon atoms, glyceryl palmitate-containing compositions in which fatty acid has 16 carbon atoms, glyceryl stearate-containing compositions in which fatty acid has 18 carbon atoms, glyceryl behenate-containing compositions in which fatty acid has 22 carbon atoms, glyceryl montanate-containing compositions in which fatty acid has 28 carbon atoms, and the like. Among them, the glyceryl laurate-containing compositions, the glyceryl palmitate-containing compositions and the glyceryl stearate-containing compositions are preferred. One or two or more kinds of the above glycerin fatty acid ester compositions in which an amount of monoester is controlled are optionally selected and blended.

A blend amount of the glycerin fatty acid ester composition (C) used for the rubber composition of the present invention based on 100 parts by mass of the rubber component is preferably 0.5 part by mass or more, more preferably 1 part by mass or more, further preferably 2 parts by mass or more and further more preferably 3 parts by mass or more from the viewpoints of reducing a viscosity of the unvulcanized rubber and improving the low air permeability and the bending resistance, and from the viewpoint of preventing the physical properties of the rubber from being excessively reduced (reduction in the storage elastic modulus, and the like) after vulcanization, it is preferably 20 parts by mass or less, more preferably 15 parts by mass or less, further preferably 12 parts by mass or less, further more preferably 11 parts by mass or less, further more preferably 10 parts by mass or less, preferably 0.5 to 20 parts by mass, more preferably 1 to 15 parts by mass, further preferably 2 to 12 parts by mass, further more preferably 3 to 11 parts by mass and further more preferably 3 to 10 parts by mass.

Also, a blend amount of the glycerin fatty acid ester composition (C) in the rubber composition of the present invention based on 100 parts by mass of the stratified or tabular clay mineral (B) is preferably 0.1 part by mass or more, more preferably 0.25 part by mass or more and further preferably 0.5 part by mass or more, further more preferably 1 part by mass or more from the viewpoint of reducing a viscosity of the unvulcanized rubber, and from the viewpoint of preventing the physical properties of the rubber from being excessively reduced (reduction in the storage elastic modulus, and the like) after vulcanization, it is preferably 20 parts by mass or less, more preferably 15 parts by mass or less, further preferably 12 parts by mass or less, further more preferably 10 parts by mass or less, further more preferably 8 parts by mass or less, further more preferably 7 parts by mass or less, preferably 0.1 to 20 parts by mass, more preferably 0.25 to 15 parts by mass, further more preferably 0.25 to 10 parts by mass, further more preferably 0.5 to 8 parts by mass and more preferably 1 to 7 parts by mass.

Also, a blend amount of the glycerin in the rubber composition of the present invention based on 100 parts by mass of the rubber component is preferably 0.5 part by mass or less, further preferably 0.3 part by mass or less and further more preferably 0.1 part by mass or less from the viewpoint of preventing the heat resistance from being reduced, and it may be 0.01 part by mass or more from the viewpoint of the productivity.

Also, a blend amount of the glycerin fatty acid triester in the rubber composition of the present invention based on 100 parts by mass of the rubber component is preferably 0.5 part by mass or less, further preferably 0.3 part by mass or less and further more preferably 0.1 part by mass or less from the viewpoint of preventing the physical properties of the rubber from being excessively reduced (reduction in the storage elastic modulus, and the like) after vulcanization, and it may be 0.01 part by mass or more from the viewpoint of the productivity.

Rubber Composition and Production Process for the Same:

The rubber composition of the present invention can be blended with the rubber component (A), the stratified or tabular clay mineral (B) and the glycerin fatty acid ester composition (C), and in addition thereto, blend agents usually used in the rubber industry including, for example, antioxidants, softening agents, stearic acid, zinc oxide, vulcanization accelerators, vulcanization accelerator aids, vulcanizing agents, and the like can suitably be selected and blended therewith as long as the objects of the present invention are not retarded. Commercial products can suitably be used as the above blend agents.

Also, the rubber composition of the present invention is obtained by kneading the rubber component (A), the stratified or tabular clay mineral (B) and the glycerin fatty acid ester composition (C) with various blend agents suitably selected if necessary by means of a kneading equipment such as a roll, an internal mixer and the like, and then warming and extruding the blended matter, and the extruded matter is vulcanized after molding, whereby it can suitably be used for applications of tire members of a tire, such as inner liners, tire treads, undertreads, carcasses, sidewalls, bead parts and the like. In particular, the above rubber composition can suitably be used for the inner liners since it is excellent in a low air permeability and a bending resistance. Accordingly, the rubber composition of the present invention is obtained preferably by blending 100 parts by mass of the rubber component (A) with preferably 20 parts by mass or more of the stratified or tabular clay mineral (B) and the glycerin fatty acid ester composition (C) and then kneading and vulcanizing the blended matter. A production process therefor comprises preferably a step in which 100 parts by mass of the rubber component (A) is blended with preferably 20 parts by mass or more of the stratified or tabular clay mineral (B) and the glycerin fatty acid ester composition (C) and in which the blended matter is then kneaded and vulcanized. The blend amounts and the preferred ranges of the respective components have been described above.

The reasons why the rubber composition thus constituted causes an unvulcanized rubber to be reduced in a viscosity and why it is improved as well in a low air permeability, a bending resistance and a heat resistance are guessed as follows.

The rubber composition of the present invention is blended with the rubber component, the stratified or tabular clay mineral and the glycerin fatty acid ester composition. In this case, the glycerin fatty acid ester composition hydrophobizes the surface of the stratified or tabular clay mineral, and therefore the stratified or tabular clay mineral is improved in a dispersion state in the rubber composition. Accordingly, it is considered that the unvulcanized rubber is reduced in a viscosity and that the rubber composition is improved in a low air permeability and a bending resistance. Also, the glycerin fatty acid ester composition provides the rubber component with a plasticity and exerts a lubrication action to the stratified or tabular clay mineral, and therefore it is considered that the unvulcanized rubber is further reduced in a viscosity and that it contributes as well to an improvement in a heat resistance of the rubber composition.

Tire, Viscosity Reduction Method for an Unvulcanized Rubber and Use for Inner Liner of Tire:

A tire can be produced by a usual process using the rubber composition of the present invention. For example, the rubber composition of the present invention blended with various blend agents as described above is extruded and processed into a tire member, for example, a member for an inner liner at an unvulcanized stage, and the member is stuck on a tire under molding by a usual method in a tire molding machine, whereby a green tire is molded. The above green tire is heated and pressed in a vulcanizing machine to obtain a tire which is excellent in a low air permeability and a bending resistance and has a good low fuel consumption and which is excellent as well in a productivity because of a good processability of the above rubber composition.

Accordingly, the viscosity reduction method for an unvulcanized rubber according to the present invention is characterized by blending the rubber component (A) with the stratified or tabular clay mineral (B) and the glycerin fatty acid ester composition (C), and the rubber composition described above is characterized by being used for an inner liner of a tire.

The preferred compositions and the preferred rages of the respective components (A) to (C) used in the viscosity reduction method for an unvulcanized rubber and use for an inner liner according to the present invention are the same as those of the rubber composition described above.

EXAMPLES

Next, the present invention shall be explained in further details with reference to production examples, examples and comparative examples, but the present invention shall by no means be restricted to the following examples.

Production Examples 1 to 8

Glycerin fatty acid ester compositions obtained by the following respective production methods were used. The contents of the respective components of glycerin fatty acid monoester (monoglyceride), glycerin fatty acid diester, glycerin fatty acid triester and glycerin in the respective glycerin fatty acid ester compositions produced were calculated by the methods described above to determine the respective compositions.

Production Example 1: Glycerin Fatty Acid Ester in which Fatty Acid has 8 Carbon Atoms (Used in Example 1)

A 1 liter four neck flask equipped with a stirrer, a dewatering tube-cooling tube, a thermometer and a nitrogen-introducing tube was charged with 450 g of glycerin and 352 g of octanoic acid (Lunac 8-98, manufactured by Kao Corporation) (glycerin/fatty acid (mole ratio)=2.0), and sodium hydroxide dissolved in a small amount of water was added thereto in an amount of 10 ppm in terms of sodium. Then, the flask was heated up to 240° C. in about 1.5 hour under stirring at 400 r/min while causing nitrogen to flow to a space part on the liquid at a rate of 100 ml/minute. After reached 240° C., water was removed while the acid component was refluxed in the flask, and the reaction was continued at the above temperature for 4 hours. A content of the monoglyceride in the product after the reaction was 67 area %.

Subsequently, the reaction mixture was cooled down to 170° C., and glycerin was removed by distilling the mixture at the above temperature under a reduced pressure of 2.7 kPa or less. Further, steam was supplied to the flask at 150° C. and 2 kPa for 2 hours. Then, the mixture was subjected to adsorption filtration under an elevated pressure by means of Zeta Plus 30S (manufactured by CUNO Inc.) to obtain a monoglyceride-containing composition. The composition thus obtained was measured by GPC to thereby determine the compositions of the respective components.

Production Example 2: Glycerin Fatty Acid Ester in which Fatty Acid has 10 Carbon Atoms (Used in Example 2)

The reaction was carried out in the same manner as in Example 1, except that in Example 1 described above, octanoic acid was changed to an equimolar amount of decanoic acid (Lunac 10-98, manufactured by Kao Corporation), and glycerin was removed in the same manner, followed by subjecting the mixture to adsorption filtration. The monoglyceride-containing composition obtained after the adsorption filtration was measured by GPC to thereby determine the compositions of the respective components.

Production Example 3: Glycerin Fatty Acid Ester in which Fatty Acid has 12 Carbon Atoms (Used in Examples 3)

The reaction was carried out in the same manner as in Example 1, except that in Example 1 described above, octanoic acid was changed to an equimolar amount of lauric acid (Lunac L-98, manufactured by Kao Corporation), and glycerin was removed in the same manner, followed by subjecting the mixture to adsorption filtration. The monoglyceride-containing composition obtained after the adsorption filtration was measured by GPC to thereby determine the compositions of the respective components.

Production Example 4: Glycerin Fatty Acid Ester in which Fatty Acid has 16 Carbon Atoms (Used in Examples 4, 19 to 23, 25 to 32, 34, 36 and 38)

The glycerin fatty acid ester composition used in Examples 4, 19 to 23, 25 to 32, 34, 36 and 38 was produced by carrying out the reaction in the same manner as in Example 1, except that in Example 1 described above, octanoic acid was changed to an equimolar amount of palmitic acid (Lunac P-95, manufactured by Kao Corporation), removing glycerin in the same manner, and subjecting the mixture to adsorption filtration. The monoglyceride-containing composition obtained after the adsorption filtration was measured by GPC to thereby determine the compositions of the respective components.

Also, the glycerin fatty acid ester composition used in Example 10 was prepared by subjecting the glycerin fatty acid ester composition obtained in Production Example 4 to molecular distillation on the conditions of a distillation temperature of 215° C. and a reduced pressure of 0.1 mm Hg by means of a Smith distillation equipment.

The glycerin fatty acid ester used in Example 8 was prepared by mixing the glycerin fatty acid ester produced in Production Example 4 and the glycerin fatty acid ester used in Example 10 in a weight ratio of 70:30.

The glycerin fatty acid ester used in Example 9 was prepared by mixing the glycerin fatty acid ester produced in Production Example 4 and the glycerin fatty acid ester used in Example 10 in a weight ratio of 35:65.

Production Example 5: Glycerin Fatty Acid Ester in which Fatty Acid has 16 Carbon Atoms (Used in Example 7)

The reaction was carried out in the same manner as in Example 1, except that in Example 1 described above, an amount of glycerin was changed to 280 g and that octanoic acid was changed to 520 g of palmitic acid (Lunac P-95, manufactured by Kao Corporation) (glycerin/fatty acid (mole ratio)=1.5), and glycerin was removed in the same manner, followed by subjecting the mixture to adsorption filtration. The monoglyceride-containing composition obtained after the adsorption filtration was measured by GPC to thereby determine the compositions of the respective components.

Production Example 6: Glycerin Fatty Acid Ester in which Fatty Acid has 18 Carbon Atoms (Used in Examples 5, 14 to 18, 24, 33, 35 and 37)

The reaction was carried out in the same manner as in Example 1, except that in Example 1 described above, octanoic acid was changed to an equimolar amount of stearic acid (Lunac S-98, manufactured by Kao Corporation), and glycerin was removed in the same manner, followed by subjecting the mixture to adsorption filtration. The monoglyceride-containing composition obtained after the adsorption filtration was measured by GPC to thereby determine the compositions of the respective components.

The glycerin fatty acid ester composition used in Example 12 was prepared by mixing the glycerin fatty acid ester produced in Production Example 6 and glycerol distearate manufactured by Wako Pure Chemical Industries Ltd. in a weight ratio of 35:65. The mixture was measured by GPC to thereby determine the compositions of the respective components.

The glycerin fatty acid ester used in Example 13 was prepared by mixing the glycerin fatty acid ester produced in Production Example 6 and glycerol distearate manufactured by Wako Pure Chemical Industries Ltd. in a weight ratio of 55:45. The mixture was measured by GPC to thereby determine the compositions of the respective components.

Production Example 7: Glycerin Fatty Acid Ester in which Fatty Acid has 22 Carbon Atoms (Used in Example 6)

The reaction was carried out in the same manner as in Example 1, except that in Example 1 described above, octanoic acid was changed to an equimolar amount of behenic acid (Lunac BA, manufactured by Kao Corporation), and glycerin was removed in the same manner, followed by subjecting the mixture to adsorption filtration. The monoglyceride-containing composition obtained after the adsorption filtration was measured by GPC to thereby determine the compositions of the respective components.

Excel T-95 manufactured by Kao Corporation was used as it was for the glycerin fatty acid ester composition used in Example 11. The above product was measured by GPC to thereby determine the compositions of the respective components.

Examples 1 to 38 and Comparative Examples 1 to 15

Rubber compositions were prepared by an ordinary method according to blend prescriptions shown in the following Table 1 to Table 5. The respective glycerin fatty acid ester compositions obtained in the production examples were described in upper columns in Table 1 to Table 5. Numerical values shown in lower columns than the columns of the glycerin fatty acid ester compositions in Table 1 to Table 5 are shown by mass parts.

The respective rubber compositions thus obtained were used to measure an unvulcanized rubber viscosity, a low air permeability and a bending resistance by the following measuring methods. Also, the toughness (heat resistance) was further measured by the following measuring method in Examples 1 to 13 and Comparative Examples 1 to 3 shown in Table 1.

The results thereof are shown in the following Table 1 to Table 5. The blend prescriptions in which the number of carbon atoms of the glycerin fatty acid esters in the rubber blend compositions of the rubber component, the stratified or tabular clay mineral (clay) and the glycerin fatty acid ester was changed are shown in Table 1; the blend prescriptions in which the blend part of the stratified or tabular clay mineral (clay) was changed are shown in Table 2; the blend prescriptions in which the blend part of the glycerin fatty acid ester was changed are shown in Table 3; the blend prescriptions in which the rubber component was changed are shown in Table 4; and the blend prescriptions in which the stratified or tabular clay mineral and the like were changed are shown in Table 5.

Measuring Method of Unvulcanized Rubber Viscosity:

The unvulcanized rubber viscosity was measured in conformity with JIS K 6300-1: 2001 (Mooney viscosity and Mooney scorch time).

The results were shown by an index, wherein the value of Comparative Example 1 was set to 100. It is shown that the smaller the value of the unvulcanized rubber viscosity is, the better the workability is.

Measuring Method of Air Permeability:

The rubber compositions after vulcanized obtained in Examples 1 to 38 and Comparative Examples 1 to 15 were used to measure air permeation coefficients at 23° C.±2° C. by means of an oxygen permeability measuring equipment (manufactured by Toyo Seiki Seisaku-sho, Ltd.) in conformity with JIS K7126-2: 2006 "plastic-film and seat-gas permeability test method-part 2: equal pressure method".

An air permeability index was determined from the air permeation coefficient obtained above according to the following and shown by an index, wherein the value of Comparative Example 1 was set to 100. It is shown that the smaller the index is, the better the air permeation resistance (gas barriering property) is.

Air permeation index={(air permeation coefficient of trial vulcanized rubber composition)/(air permeation coefficient of vulcanized rubber composition of Comparative Example 1)}×100

Measuring Method of Bending Resistance:

The rubber compositions after vulcanized obtained in Examples 1 to 38 and Comparative Examples 1 to 15 were used to prepare vulcanized rubber test pieces in conformity with a bending test method of JIS K6260: 2010, and a bending test was carried out to measure time required until cracks of 10 mm were formed on the test pieces. A bending resistant index was determined according to the following equation and shown by an index, wherein the value of Comparative Example 1 was set to 100. It is shown that the larger the index is, the more excellent the bending resistance is.

Bending resistant index={(time required until cracks were formed on trial vulcanized rubber composition)/(time required until cracks were formed on vulcanized rubber composition of Comparative Example 1)}×100

Measuring Method of Toughness:

The unvulcanized rubber was vulcanized at 160° C. for 20 minutes and then degraded at 100° C. for 2 days (thermal degradation conditions). Then, the degraded rubber was subjected to a tensile test in conformity with JIS K 6251, whereby Eb (elongation (%) in breakage) and Tb (tensile strength (MPa)) were measured to determine TF (toughness: Eb×Tb) after the thermal degradation, and the results thereof were shown by indices, wherein the value of Comparative Example 1 in Table 1 was set to 100 as was the case with what was described above. It is shown that the larger the value thereof is, the higher the toughness (heat resistance) is.

TABLE 1

|  | Comparative Example | | | Example | | | | | | | | | | | | |
| --- | --- | --- | --- | --- | --- | --- | --- | --- | --- | --- | --- | --- | --- | --- | --- | --- |
|  | 1 | 2 | 3 | 1 | 2 | 3 | 4 | 5 | 6 | 7 | 8 | 9 | 10 | 11 | 12 | 13 |
| Glycerin fatty acid ester composition | | | | | | | | | | | | | | | | |
| Carbon number n | | | | 8 | 10 | 12 | 16 | 18 | 22 | 16 | 16 | 16 | 16 | 18 | 18 | 18 |
| Content (% by mass) | | | | | | | | | | | | | | | | |
| Glycerin fatty acid monoester | | | | 56 | 61 | 62 | 64 | 57 | 51 | 52 | 73 | 84 | 95 | 97 | 20 | 32 |
| Glycerin fatty acid diester | | | | 42 | 36 | 36 | 34 | 41 | 47 | 44 | 25 | 14 | 4 | 2 | 79 | 67 |
| Glycerin fatty acid triester | | | | 1 | 2 | 1 | 1 | 1 | 1 | 2 | 1 | 1 | 0.5 | 0.5 | 0.5 | 0.5 |
| Glycerin | | | | 1 | 1 | 1 | 1 | 1 | 2 | 1 | 1 | 1 | 0.5 | 0.5 | 0.5 | 0.5 |
| Brominated butyl rubber *1 | 100 | 100 | 100 | 100 | 100 | 100 | 100 | 100 | 100 | 100 | 100 | 100 | 100 | 100 | 100 | 100 |
| Carbon black *2 | 10 | 10 | 10 | 10 | 10 | 10 | 10 | 10 | 10 | 10 | 10 | 10 | 10 | 10 | 10 | 10 |
| Clay *3 | 100 | 100 | 100 | 100 | 100 | 100 | 100 | 100 | 100 | 100 | 100 | 100 | 100 | 100 | 100 | 100 |
| Process oil *4 | 10 | 15 | 20 | 10 | 10 | 10 | 10 | 10 | 10 | 10 | 10 | 10 | 10 | 10 | 10 | 10 |
| Stearic acid | 1 | 1 | 1 | 1 | 1 | 1 | 1 | 1 | 1 | 1 | 1 | 1 | 1 | 1 | 1 | 1 |
| Zinc oxide | 3 | 3 | 3 | 3 | 3 | 3 | 3 | 3 | 3 | 3 | 3 | 3 | 3 | 3 | 3 | 3 |
| Vulcanization accelerator DM *5 | 1 | 1 | 1 | 1 | 1 | 1 | 1 | 1 | 1 | 1 | 1 | 1 | 1 | 1 | 1 | 1 |
| Sulfur | 1 | 1 | 1 | 1 | 1 | 1 | 1 | 1 | 1 | 1 | 1 | 1 | 1 | 1 | 1 | 1 |
| Glycerin fatty acid ester having above composition | | | | 5 | 5 | 5 | 5 | 5 | 5 | 5 | 5 | 5 | 5 | 5 | 5 | 5 |
| Unvulcanized viscosity | 100 | 98 | 95 | 90 | 90 | 90 | 90 | 90 | 90 | 90 | 89 | 88 | 87 | 87 | 95 | 92 |
| Air permeability (index) | 100 | 110 | 120 | 95 | 95 | 95 | 94 | 94 | 95 | 95 | 94 | 93 | 92 | 92 | 98 | 95 |
| Bending resistance (index) | 100 | 102 | 104 | 110 | 111 | 111 | 112 | 112 | 111 | 110 | 112 | 114 | 115 | 115 | 104 | 106 |
| Toughness (index) | 100 | 98 | 96 | 108 | 109 | 119 | 110 | 109 | 109 | 109 | 107 | 107 | 100 | 100 | 98 | 99 |

TABLE 2

| | Example | | | | | | | | | | | | Comparative Example | | | | |
|---|---|---|---|---|---|---|---|---|---|---|---|---|---|---|---|---|---|
| | 14 | 15 | 16 | 17 | 18 | 19 | 20 | 21 | 22 | 23 | 24 | 25 | 4 | 5 | 6 | 7 | 8 |
| Glycerin fatty acid ester composition | | | | | | | | | | | | | | | | | |
| Carbon number n | 18 | 18 | 18 | 18 | 18 | 16 | 16 | 16 | 16 | 16 | 18 | 16 | | | | | |
| Content (% by mass) | | | | | | | | | | | | | | | | | |
| Glycerin fatty acid monoester | 57 | 57 | 57 | 57 | 57 | 64 | 64 | 64 | 64 | 64 | 57 | 64 | | | | | |
| Glycerin fatty acid diester | 41 | 41 | 41 | 41 | 41 | 34 | 34 | 34 | 34 | 34 | 41 | 34 | | | | | |
| Glycerin fatty acid triester | 1 | 1 | 1 | 1 | 1 | 1 | 1 | 1 | 1 | 1 | 1 | 1 | | | | | |
| Glycerin | 1 | 1 | 1 | 1 | 1 | 1 | 1 | 1 | 1 | 1 | 1 | 1 | | | | | |
| Brominated butyl rubber *1 | 100 | 100 | 100 | 100 | 100 | 100 | 100 | 100 | 100 | 100 | 100 | 100 | 100 | 100 | 100 | 100 | 100 |
| Carbon black *2 | 10 | 10 | 10 | 10 | 10 | 10 | 10 | 10 | 10 | 10 | 10 | 10 | 10 | 10 | 10 | 10 | 10 |
| Clay *3 | 20 | 50 | 80 | 120 | 150 | 20 | 50 | 80 | 120 | 150 | 10 | 10 | 20 | 50 | 80 | 120 | 150 |
| Process oil *4 | 10 | 10 | 10 | 10 | 10 | 10 | 10 | 10 | 10 | 10 | 10 | 10 | 10 | 10 | 10 | 10 | 10 |
| Stearic acid | 1 | 1 | 1 | 1 | 1 | 1 | 1 | 1 | 1 | 1 | 1 | 1 | 1 | 1 | 1 | 1 | 1 |
| Zinc oxide | 3 | 3 | 3 | 3 | 3 | 3 | 3 | 3 | 3 | 3 | 3 | 3 | 3 | 3 | 3 | 3 | 3 |
| Vulcanization accelerator DM *5 | 1 | 1 | 1 | 1 | 1 | 1 | 1 | 1 | 1 | 1 | 1 | 1 | 1 | 1 | 1 | 1 | 1 |
| Sulfur | 1 | 1 | 1 | 1 | 1 | 1 | 1 | 1 | 1 | 1 | 1 | 1 | 1 | 1 | 1 | 1 | 1 |
| Glycerin fatty acid ester having above composition | 1 | 2.5 | 4 | 6 | 7.5 | 1 | 2.5 | 4 | 6 | 7.5 | 0.5 | 0.5 | | | | | |
| Unvulcanized viscosity | 75 | 80 | 83 | 98 | 109 | 77 | 80 | 83 | 98 | 108 | 73 | 72 | 81 | 85 | 91 | 110 | 123 |
| Air permeability (index) | 170 | 130 | 105 | 90 | 77 | 172 | 132 | 107 | 92 | 78 | 185 | 190 | 175 | 135 | 110 | 95 | 80 |
| Bending resistance (index) | 125 | 120 | 112 | 95 | 85 | 125 | 115 | 110 | 95 | 85 | 130 | 130 | 115 | 110 | 105 | 90 | 80 |

TABLE 3

| | Example | | | | | | | Comparative Example | |
|---|---|---|---|---|---|---|---|---|---|
| | 26 | 27 | 28 | 29 | 30 | 31 | 32 | 9 | 10 |
| Glycerin fatty acid ester composition | | | | | | | | | |
| Carbon number n | 16 | 16 | 16 | 16 | 16 | 16 | 16 | | |
| Content (% by mass) | | | | | | | | | |
| Glycerin fatty acid monoester | 64 | 64 | 64 | 64 | 64 | 64 | 64 | | |
| Glycerin fatty acid diester | 34 | 34 | 34 | 34 | 34 | 34 | 34 | | |
| Glycerin fatty acid triester | 1 | 1 | 1 | 1 | 1 | 1 | 1 | | |
| Glycerin | 1 | 1 | 1 | 1 | 1 | 1 | 1 | | |
| Brominated butyl rubber *1 | 100 | 100 | 100 | 100 | 100 | 100 | 100 | 100 | 100 |
| Carbon black *2 | 10 | 10 | 10 | 10 | 10 | 20 | 40 | 20 | 40 |
| Clay *3 | 100 | 100 | 100 | 100 | 100 | 100 | 100 | 100 | 100 |
| Process oil *4 | 10 | 10 | 10 | 10 | 10 | 10 | 10 | 10 | 10 |
| Stearic acid | 1 | 1 | 1 | 1 | 1 | 1 | 1 | 1 | 1 |
| Zinc oxide | 3 | 3 | 3 | 3 | 3 | 3 | 3 | 3 | 3 |
| Vulcanization accelerator DM *5 | 1 | 1 | 1 | 1 | 1 | 1 | 1 | 1 | 1 |
| Sulfur | 1 | 1 | 1 | 1 | 1 | 1 | 1 | 1 | 1 |
| Glycerin fatty acid ester having above composition | 1 | 5 | 10 | 20 | 25 | 5 | 5 | 0 | 0 |
| Unvulcanized viscosity | 95 | 90 | 80 | 80 | 80 | 110 | 175 | 120 | 195 |
| Air permeability (index) | 98 | 94 | 90 | 90 | 90 | 90 | 88 | 96 | 94 |
| Bending resistance (index) | 110 | 112 | 120 | 120 | 120 | 80 | 15 | 75 | 10 |

TABLE 4

| | Example | | | | Comparative Example | |
|---|---|---|---|---|---|---|
| | 33 | 34 | 35 | 36 | 11 | 12 |
| Glycerin fatty acid ester composition | | | | | | |
| Carbon number n | 18 | 16 | 18 | 16 | | |
| Content (% by mass) | | | | | | |
| Glycerin fatty acid monoester | 57 | 64 | 57 | 64 | | |
| Glycerin fatty acid diester | 41 | 34 | 41 | 34 | | |
| Glycerin fatty acid triester | 1 | 1 | 1 | 1 | | |
| Glycerin | 1 | 1 | 1 | 1 | | |
| Brominated butyl rubber *1 | 80 | 80 | 50 | 50 | 80 | 50 |
| Natural rubber *6 | 20 | 20 | 50 | 50 | 20 | 50 |
| Carbon black *2 | 10 | 10 | 10 | 10 | 10 | 10 |
| Clay *3 | 100 | 100 | 100 | 100 | 100 | 100 |
| Process oil *4 | 10 | 10 | 10 | 10 | 10 | 10 |
| Stearic acid | 1 | 1 | 1 | 1 | 1 | 1 |

TABLE 4-continued

|  | Example | | | | Comparative Example | |
|---|---|---|---|---|---|---|
|  | 33 | 34 | 35 | 36 | 11 | 12 |
| Zinc oxide | 3 | 3 | 3 | 3 | 3 | 3 |
| Vulcanization accelerator DM *5 | 1 | 1 | 1 | 1 | 1 | 1 |
| Sulfur | 1 | 1 | 1 | 1 | 1 | 1 |
| Glycerin fatty acid ester having above composition | 2.5 | 2.5 | 2.5 | 2.5 | 0 | 0 |
| Unvulcanized viscosity | 110 | 110 | 122 | 122 | 125 | 135 |
| Air permeability (index) | 180 | 185 | 300 | 295 | 190 | 330 |
| Bending resistance (index) | 80 | 78 | 70 | 68 | 70 | 60 |

TABLE 5

|  | Example | | Comparative Example | | |
|---|---|---|---|---|---|
|  | 37 | 38 | 13 | 14 | 15 |
| Glycerin fatty acid ester composition |  |  |  |  |  |
| Carbon number n | 18 | 16 |  |  |  |
| Content (% by mass) |  |  |  |  |  |
| Glycerin fatty acid monoester | 57 | 64 |  |  |  |
| Glycerin fatty acid diester | 41 | 34 |  |  |  |
| Glycerin fatty acid triester | 1 | 1 |  |  |  |
| Glycerin | 1 | 1 |  |  |  |
| Brominated butyl rubber *1 | 100 | 100 | 100 | 100 | 100 |
| Carbon black *2 | 10 | 10 | 10 | 10 | 10 |
| Clay *3 | 50 | 50 | 50 | 100 | 100 |
| Talc *7 | 50 | 50 | 50 |  |  |
| Process oil *4 | 10 | 10 | 10 | 10 | 10 |
| Stearic acid | 1 | 1 | 3 | 3 | 3 |
| Zinc oxide | 3 | 3 | 3 | 3 | 3 |
| Vulcanization accelerator DM *5 | 1 | 1 | 1 | 1 | 1 |
| Sulfur | 1 | 1 | 1 | 1 | 1 |
| Glycerin fatty acid ester having above composition | 5 | 5 |  |  |  |
| DM80 *8 |  |  |  | 5 | 10 |
| Unvulcanized viscosity | 90 | 90 | 99 | 99 | 98 |
| Air permeability (index) | 85 | 85 | 90 | 101 | 102 |
| Bending resistance (index) | 118 | 118 | 105 | 99 | 98 |

*1 to *8 in Table 1 to Table 5 show the followings.

*1): trade name "JSR BROMOBUTYL 2255", manufactured by JSR Corporation

*2): N660, trade name "Asahi #55" (N2SA: 26 $m^2/g$, DBP absorption: 87 $cm^3/100$ g), manufactured by Asahi Carbon Co., Ltd.

*3): flat clay, trade name "POLYFIL DL" (aspect ratio: 10, average particle diameter: 1 μm), manufactured by J.M. Huber Corporation (flat clay is kaolin base clay having a large aspect ratio)

*4): paraffinic oil, trade name "Diana Process Oil PW-90", manufactured by Idemitsu Kosan Co., Ltd.

*5): Nocceler DM (di-2-benzothiazolyl disulfide), manufactured by Ouchi Shinko Chemical Industrial Co., Ltd.

*6): natural rubber RSS No. 3

*7): flat talc, "HAR talc", manufactured by Imerys Talc Co., Ltd.

*8): dispersion improving agent, "Farmine DM8098" (dimethylstearylamine), manufactured by Kao Corporation As apparent from the results shown in Table 1 to Table 5, it has become clear from the evaluation results of the unvulcanized rubber viscosity, the air permeability and the bending resistance that the rubber compositions produced in Examples 1 to 38 encompassed in the scope of the present invention are not increased in a viscosity of an unvulcanized rubber and improved in a low air permeability and a bending resistance as compared with the rubber compositions produced in Comparative Examples 1 to 15 out of the scope of the present invention.

To investigate individually the results shown in Table 1 to Table 5, the blend prescriptions in which the number of carbon atoms of the glycerin fatty acid ester was changed in the rubber blend compositions of the rubber component, the stratified or tabular clay mineral (clay) and the glycerin fatty acid ester are shown in Examples 1 to 13 of Table 1. In the above cases, it becomes clear that produced are the rubber compositions which are improved in a low air permeability, a bending resistance and a toughness (heat resistance) without increasing a viscosity of the unvulcanized rubbers as compared with those produced in Comparative Examples 1 to 3.

The blend prescriptions in which the blend part number of the stratified or tabular clay mineral (clay) was changed in the rubber blend compositions of the rubber component, the stratified or tabular clay mineral (clay) and the glycerin fatty acid ester are shown in Table 2. Also in the above cases, it becomes clear that produced are the rubber compositions which are improved in a low air permeability and a bending resistance without increasing a viscosity of the unvulcanized rubbers as compared with those produced in Comparative Examples 4 to 8.

The blend prescriptions in which the blend part number of the glycerin fatty acid ester was changed in the rubber blend compositions of the rubber component, the stratified or tabular clay mineral (clay) and the glycerin fatty acid ester are shown in Table 3. Also in the above cases, it becomes clear that produced are the rubber compositions which are improved in a low air permeability and a bending resistance without increasing a viscosity of the unvulcanized rubbers as compared with those produced in Comparative Examples 9 to 10.

The blend prescriptions in which the rubber component was changed in the rubber blend compositions of the rubber component, the stratified or tabular clay mineral (clay) and the glycerin fatty acid ester are shown in Table 4. Also in the above cases, it becomes clear that produced are the rubber compositions which are improved in a low air permeability, a bending resistance and a toughness (heat resistance) without increasing a viscosity of the unvulcanized rubbers as compared with those produced in Comparative Examples 11 to 12.

The blend prescriptions in which the stratified or tabular clay mineral was changed in the rubber blend compositions of the rubber component, the stratified or tabular clay mineral (clay) and the glycerin fatty acid ester are shown in Table 5. Also in the above cases, it becomes clear that produced are the rubber compositions which are improved in a low air permeability, a bending resistance and a toughness (heat resistance) without increasing a viscosity of the unvulcanized rubbers as compared with those produced in Comparative Example 13 no glycerin fatty acid ester blended and Comparative Examples 14 and 15 (conventional dispersion improving agent).

INDUSTRIAL APPLICABILITY

A rubber composition suited to an inner liner of a tire for passenger cars, trucks, buses and the like, and a tire produced by using the same are obtained.

What is claimed is:

1. A rubber composition being prepared by blending:
a rubber component (A),
a stratified or tabular clay mineral (B), and
a glycerin fatty acid ester composition (C), wherein the glycerin fatty acid ester composition (C) contains:
glycerin fatty acid monoester and glycerin fatty acid diester, and the content of the glycerin fatty acid monoester in the glycerin fatty acid ester composition is 35% by mass or more, wherein the rubber component (A) is a diene base rubber, a butyl base rubber or a mixture thereof.

2. The rubber composition as described in claim 1, wherein the blend amount of the glycerin fatty acid ester composition (C) is 0.1 to 20 parts by mass based on 100 parts by mass of the stratified or tabular clay mineral (B).

3. The rubber composition as described in claim 1, wherein the blend amount of the glycerin fatty acid ester composition (C) is 0.25 to 10 parts by mass based on 100 parts by mass of the stratified or tabular clay mineral (B).

4. The rubber composition as described in claim 1, wherein the blend amount of the glycerin fatty acid ester composition (C) is 0.5 to 20 parts by mass based on 100 parts by mass of the rubber component (A).

5. The rubber composition as described in claim 1, wherein the blend amount of the stratified or tabular clay mineral (B) is 20 to 200 parts by mass based on 100 parts by mass of the rubber component (A).

6. The rubber composition as described in claim 1, wherein the stratified or tabular clay mineral (B) is clay, mica, talc or feldspar.

7. The rubber composition as described in claim 1, wherein the rubber composition is a rubber composition for an inner liner of a tire.

8. The rubber composition as described in claim 1, wherein the fatty acid of the glycerin fatty acid ester composition (C) has 8 to 28 carbon atoms.

9. A rubber composition being prepared by blending:
a rubber component (A),
a stratified or tabular clay mineral (B), and
a glycerin fatty acid ester composition (C), wherein the glycerin fatty acid ester composition (C) contains:
glycerin fatty acid monoester and glycerin fatty acid diester, and the content of the glycerin fatty acid monoester in the glycerin fatty acid ester composition is 35% by mass or more, wherein the stratified or tabular clay mineral (B) is clay.

10. A rubber composition being prepared by blending:
a rubber component (A),
a stratified or tabular clay mineral (B), and
a glycerin fatty acid ester composition (C), wherein the glycerin fatty acid ester composition (C) contains:
glycerin fatty acid monoester and glycerin fatty acid diester, and content of the glycerin fatty acid monoester in the glycerin fatty acid ester composition is 35% by mass or more, wherein the rubber component (A) is at least one selected from the group consisting of a natural rubber, an isoprene rubber, a styrene butadiene rubber and a butadiene rubber.

11. A rubber composition being prepared by blending
100 parts by mass of a rubber component (A),
20 parts by mass or more of a stratified or tabular clay mineral (B), and
a glycerin fatty acid ester composition (C); and
kneading and vulcanizing the blended matter;
wherein the glycerin fatty acid ester composition (C) contains:
glycerin fatty acid monoester and glycerin fatty acid diester, and the content of the glycerin fatty acid monoester in the glycerin fatty acid ester composition is 35% by mass or more.

12. A tire being produced by using the rubber composition as described in claim 1 for an inner liner.

* * * * *